(12) United States Patent
Allen et al.

(10) Patent No.: US 10,138,150 B1
(45) Date of Patent: Nov. 27, 2018

(54) METHODS AND SYSTEMS FOR TREATING VINASSE

(71) Applicant: WATER SOLUTIONS INC., Sioux Falls, SD (US)

(72) Inventors: Stephen D. Allen, Eagle, ID (US);
Edward Lewis, Sioux Falls, SD (US);
Michael LoCascio, Mason City, IA (US)

(73) Assignee: WATER SOLUTIONS, INC., Sioux Falls, SD (US)

( * ) Notice: Subject to any disclaimer, the term of this patent is extended or adjusted under 35 U.S.C. 154(b) by 0 days.

(21) Appl. No.: 15/874,728

(22) Filed: Jan. 18, 2018

(51) Int. Cl.
*C02F 9/00* (2006.01)
*C02F 1/66* (2006.01)
*C02F 1/04* (2006.01)
*C02F 1/52* (2006.01)
*C02F 1/72* (2006.01)

(52) U.S. Cl.
CPC ............... *C02F 9/00* (2013.01); *C02F 1/046* (2013.01); *C02F 1/5245* (2013.01); *C02F 1/66* (2013.01); *C02F 1/722* (2013.01); *C02F 2209/08* (2013.01)

(58) Field of Classification Search
CPC ....................................................... C02F 9/00
See application file for complete search history.

(56) References Cited

U.S. PATENT DOCUMENTS

2011/0155671 A1\* 6/2011 Moody .................. B01D 21/01
210/734

\* cited by examiner

*Primary Examiner* — Peter Keyworth
(74) *Attorney, Agent, or Firm* — Kirton McConkie; Evan R. Witt (57) ABSTRACT

Systems and methods for treating vinasse are disclosed. The methods treat vinasse to generate useable water. The methods include providing vinasse, reacting the vinasse with persulfate to generate an oxidized mixture, reacting the oxidized mixture with peroxide to generate a peroxide-treated mixture, adjusting the pH of the peroxide-treated mixture to above about pH 6 to generate a pH-adjusted mixture, reacting the pH-adjusted mixture with an inorganic coagulant and a low molecular weight cationic polymer to generate solid particles, and removing the solid particles to generate a liquid fraction.

20 Claims, 4 Drawing Sheets

METHODS AND SYSTEMS FOR TREATING VINASSE

FIELD

The present disclosure relates to treating vinasse. The present disclosure may be applied to treating vinasse to produce water that is suitable for uses such as irrigation and recovered solids that are suitable for uses such as animal feed or anaerobic digestion.

BACKGROUND

Vinasse is a residual liquid remaining after the fermentation and distillation of alcohol from sugar crops. Vinasse is generated as a sugar source, such as molasses, is fermented by yeast to produce products such as ethanol, amino acids, and organic acids. Vinasse is what remains after the desired product (e.g., ethanol) is removed and is a by-product of the production of distilled alcohol beverages such as rum. In rum production, a sugar cane molasses such as black strap molasses and/or high test molasses is fermented to produce rum leaving vinasse as the remaining by-product.

Vinasse comprises an acidic mixture of up to about 10% total solids with high chemical oxygen demand (COD), high biological oxygen demand (BOD), high total suspended solids (TSS), and high total dissolved solids (TDS). Also, the composition of vinasse can vary from fermentation batch to fermentation batch and from production process to production process. Therefore, because of its composition, it can be challenging to dispose of vinasse and/or to treat vinasse to produce useable water.

While some conventional methods have been developed to treat vinasse to produce useable water, these conventional methods are ineffective and/or inefficient. For example, directly processing vinasse by distillation requires frequent and costly cleaning of the distillation apparatus. Likewise, the process of directly processing vinasse by distillation can result in an azeotropic mixture that prevents complete distillation and production of useable water.

Thus, while a variety of methods currently exist for treating vinasse to produce useable water, challenges still exist, including those listed above. Accordingly, it would be an improvement in the art to provide methods and systems for treating vinasse to produce useable water.

BRIEF SUMMARY

The present disclosure relates to treating vinasse to generate useable water. In some embodiments, the systems and methods include methods for treating vinasse including obtaining a quantity of vinasse, reacting the vinasse with persulfate to form an oxidized mixture, reacting the oxidized mixture with peroxide to form a peroxide-treated mixture, adjusting the pH of the peroxide-treated mixture to a pH value above about pH 6, and more preferably in a range from about pH 6 to about pH 7, to form a pH-adjusted mixture, reacting the pH-adjusted mixture with an inorganic coagulant and a low molecular weight cationic polymer to form solid particles, and removing the solid particles to yield a liquid fraction. The method can further comprise vacuum distilling the liquid fraction to generate a distilled fraction. The method can further comprise evaporating the liquid fraction to yield an evaporative fraction. The method can further comprise reacting the vinasse with ferrous iron ions before reacting with persulfate. In other embodiments, the ferrous iron ions are added to the vinasse to achieve a concentration of between about 1 mg/L and 25 mg/L in the vinasse. In some cases, reacting the oxidized mixture with peroxide can comprise reacting the oxidized mixture with the peroxide for about 2 to 4 hours. In other cases, the vinasse can be at a temperature above about 65° C. In yet other cases, the vinasse can be at an acidic pH, such as a pH below about 5. In other instances, the inorganic coagulant can comprise an aluminum-based inorganic coagulant. In some embodiments, the aluminum-based inorganic coagulant is aluminum chlorohydrate. In some instances, the polymer can comprise epi-dma (poly(epichlorhydrin-dimethylamine).

In some non-limiting embodiments, the method for treating vinasse includes the steps of obtaining vinasse at an acidic pH, measuring the chemical oxygen demand (COD) of the vinasse, reacting the vinasse with persulfate at a ratio of about 1 gram of persulfate per 40,000 mg/L of COD to form an oxidized mixture, reacting the oxidized mixture with peroxide to form a peroxide-treated mixture, adjusting the pH of the peroxide-treated mixture to a pH value in the range from about pH 6 to pH 7 to form a pH-adjusted mixture, reacting the pH-adjusted mixture with an aluminum-based inorganic coagulant and a low molecular weight cationic polymer to form solid particles, and removing the solid particles to yield a liquid fraction. In some instances, the method can further comprise reacting the vinasse with ferrous iron ions after measuring the COD and before reacting with persulfate. In other instances, the ferrous iron ions can be added to the vinasse to achieve a concentration of between about 1 mg/L and 25 mg/L in the vinasse. In yet other instances, reacting the oxidized mixture with peroxide can comprise reacting the oxidized mixture with a 3% hydrogen peroxide solution, such as common commercially available hydrogen peroxide, at a ratio of about 1.2 hydrogen peroxide to about 1.5 persulfate by weight. In some cases, removing the solid particles can comprise conventional mechanical separation techniques, including, but not limited to, one or more of lamella clarification, belt press, filter press, screw press, microfiltering, and centrifuging.

In some embodiments, the systems and methods include methods for generating distillation condensate water from vinasse include the steps of obtaining a quantity of vinasse at a pH value below 5, reacting the vinasse with ferrous iron ions to form a ferrous mixture, reacting the ferrous mixture with persulfate to form an oxidized mixture, reacting the oxidized mixture with peroxide to form a peroxide-treated mixture, adjusting the pH of the peroxide-treated mixture to a pH value above about pH 6, and more preferably in the range from about 6 to 7, to form a pH-adjusted mixture, reacting the pH-adjusted mixture with an aluminum-based inorganic coagulant and a low molecular weight cationic polymer to form solid particles, removing the solid particles to yield a liquid fraction, and distilling the liquid fraction to yield distillation condensate water. In other embodiments, the vinasse comprises a chemical oxygen demand of above 50,000 mg/L. In yet other embodiments, adjusting the pH of the peroxide-treated mixture comprises adjusting the pH to between about 6.0 and 6.9. In some embodiments, distilling comprises single pass vacuum distillation

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment.

Furthermore, the described features, structures, or characteristics of the disclosure may be combined in any suitable manner in one or more embodiments. In the following description, numerous specific details are provided, such as examples of influent vinasse, ferrous iron ions, oxidation chemicals and techniques, chemicals and techniques for adjusting pH, suitable inorganic coagulants, low molecular weight polymers, chemical concentrations, pH ranges, solid separation and microfiltration methods, distillation methods and techniques, reverse osmosis processes, etc., to provide a thorough understanding of embodiments of the disclosure. One having ordinary skill in the relevant art will recognize, however, that the disclosure may be practiced without one or more of the specific details, or with other methods, components, systems, materials, and so forth. In other instances, well-known structures, materials, or operations are not shown or described in detail to avoid obscuring aspects of the disclosure.

The present application relates to methods and systems for treating vinasse. In some embodiments, the present application includes methods, processes, and systems for treating vinasse. In other embodiments, the present application includes methods, processes, and systems for treating vinasse to produce useable water. In yet other embodiments, vinasse is chemically treated by chemical oxidation, coagulation and flocculation, solids separation, and distillation. The chemical oxidation can comprise one or more of treatment with ferrous iron ions, treatment with persulfate, and treatment with peroxide. The persulfate can include persulfate in any suitable form, including but not limited to, potassium persulfate, ammonium persulfate, and sodium persulfate. The peroxide can include any suitable peroxide such as commercially available 3% hydrogen peroxide. The coagulant can include any suitable inorganic coagulant, such as an aluminum chlorohydrate-type coagulant. The polymer can comprise any suitable polymer such as a low molecular weight polymer (e.g., a polymer in the 200,000 to 800,000 molecular weight range). In some cases, the polymer comprises a quaternized low molecular weight cationic polymer. In other cases, the polymer comprises a potable grade polymer. Non-limiting examples of suitable low molecular weight polymers include epi-dma and DADMAC polymers.

In some instances, the chemical treatment and coagulation and flocculation can remove sufficient solids to allow for effective and efficient distillation. In some instances, the chemical treatment and coagulation and flocculation can effectively remove and/or reduce one or more of chemical oxygen demand, biological oxygen demand, total suspended solids, total dissolved solids, total organic carbon, phosphates, nitrogens, chlorides, sulfates, chromophores, and turbidity.

In some embodiments, distilled alcohol beverages are produced by yeast fermentation and distillation of molasses. The molasses can include any suitable molasses feedstock such as third effect sugars, including black strap molasses and high test molasses. The molasses can also comprise any suitable fermentable molasses derived from sugar cane or sugar beets. The molasses can also include one or more of refiners cane molasses, beet molasses, sugar beet molasses, citrus molasses, black treacle, sorghum molasses, and cane syrup. The molasses used for fermentation can also comprise a blend of suitable molasses. The molasses can be fermented and distilled as known in the art to generate ethanol and other products. After fermentation and distillation, a portion containing the ethanol and other products is removed for further processing and the remaining portion comprises vinasse. Vinasse can also be known as molasses vinasse, cane-vinasse, beet-vinasse, sugar beet vinasse, stillage, molasses stillage, distillery wastewater, distillery slops, and cane molasses solubles. Vinasse can also include refiners cane vinasse, citrus vinasse, black treacle vinasse, and sorghum vinasse.

In some embodiments, vinasse comprises a complex mixture of compounds such as compounds remaining from the molasses feedstock and/or compounds generated during fermentation and distillation. Vinasse can comprise up to 10% or more total solids and can include organic compounds, suspended solids, dissolved solids, phosphates, nitrogens, chlorides, sulfates, chromophores, and yeasts. Typical vinasse is characterized by a chemical oxygen demand (COD) of about 50,000 mg/L to about 125,000 mg/L, a biological oxygen demand (BOD) of about 20,000 mg/L to about 50,000 g/L, total suspended solids (TSS) of about 6,000 mg/L to about 10,000 mg/L, total dissolved solids (TDS) of about 14,000 mg/L to about 20,000 mg/L or more, total organic carbon (TOC) of about 16,000 to about 24,000 mg/L, chlorides at up to 5,000 mg/L, and/or sulfates at up to 5,000 mg/L. Vinasse can also comprise an acidic pH that is below pH 5 and often in the range of pH 3.7 to pH 4.8. Additionally, vinasse removed after fermentation and distillation can be at a temperature above 60° C. and can often be above 70° C. and often in the range of 72° C. to 79° C.

In some embodiments, the composition of vinasse varies based on characteristics of the molasses feedstock that is provided. The composition of vinasse can also vary based on such factors as the regional source of the molasses feedstock, the particular fermentation and/or distillation process used, batch to batch differences, and other similar variables. The composition of vinasse and/or variable nature of the composition of vinasse can make it challenging to dispose of vinasse and/or treat vinasse to produce useable water. The composition of vinasse and/or variable nature of the composition of vinasse can prevent or make it unwise to discharge the vinasse directly to the environment. Furthermore, distilled alcohol beverage facilities are often located in areas (e.g., Caribbean islands) where clean water is a limited resource and where treatment of vinasse to produce useable water would be advantageous. However conventional methods are limited in their ability to efficiently and economically treat vinasse for discharge and/or to treat vinasse to produce useable water. For example, directly processing vinasse with distillation requires frequent and costly cleaning of the distillation apparatus. In some cases, directly processing vinasse by distillation can be limited because the distillation process generates an azeotropic mixture that can prevent complete distillation and production of useable water. In other cases, conventional methods can require neutralizing the pH of the vinasse prior to treatment and/or cooling the vinasse prior to treatment. In yet other cases, the conventional methods can require lengthy amounts of time such as 24 hours or more to treat vinasse.

Figure 1:
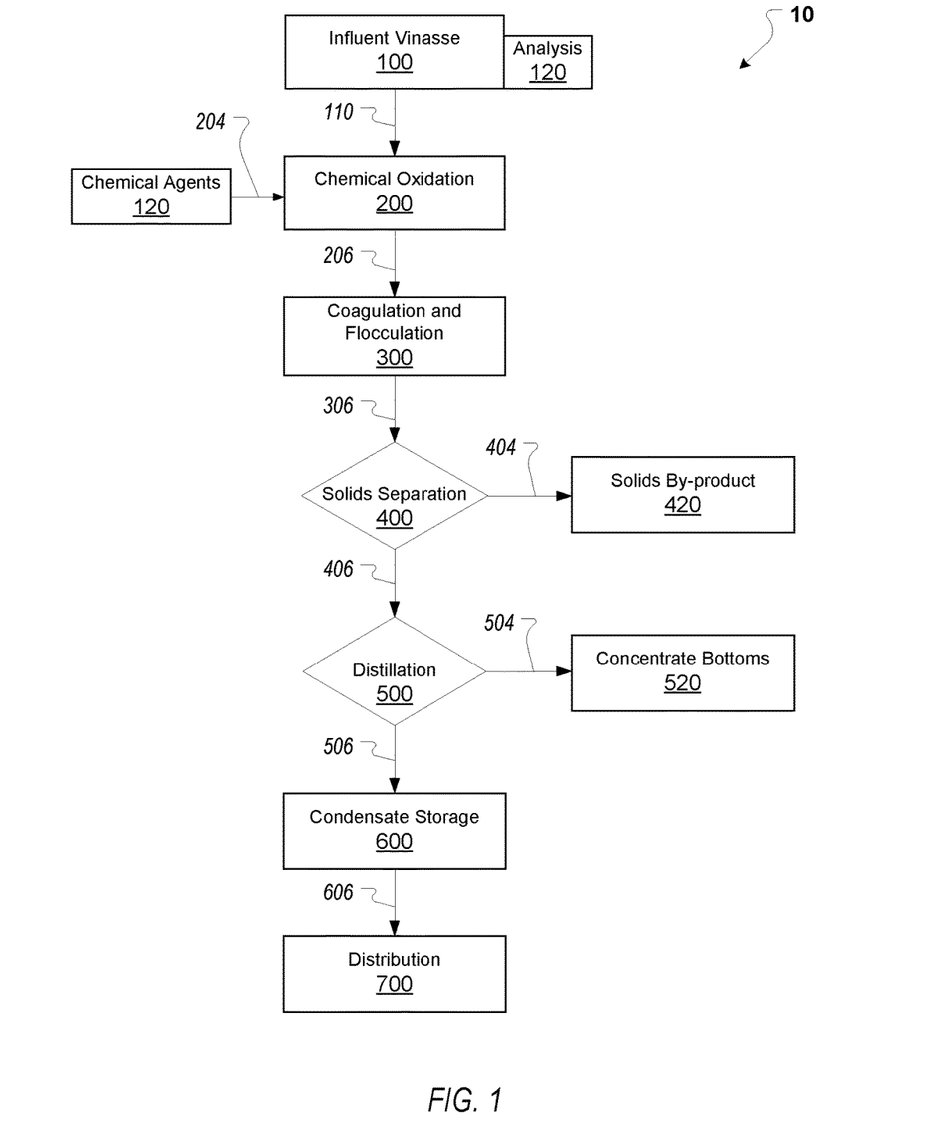
FIG. 1 illustrates systems and methods for treating vinasse.

In general (and as mentioned above), some embodiments of the described systems and methods relate to treating vinasse. While the described systems and methods can comprise any suitable component or characteristic, FIG. 1 shows that, in at least some embodiments, a system 10 comprises one or more of influent vinasse 100, a chemical oxidation system 200, a coagulation and flocculation system 300, a solids separation system 400, a distillation system 500, a condensate storage system 600, and a distribution system 700. With respect to system 10, although FIG. 1 shows influent vinasse 100, a chemical oxidation system 200, a coagulation and flocculation system 300, a solids separation system 400, a distillation system 500, a condensate storage system 600, and a distribution system 700 arranged in a particular flow path and/or step-wise order, the described systems can be arranged in any other suitable flow path and/or any other suitable step-wise order. Likewise, system 10 can be configured with fewer systems than described and/or additional systems to those described.

With respect to influent vinasse 100, in some embodiments, influent vinasse 100 comprises vinasse as described above. In some cases, influent vinasse 100 comprises one or more of the constituents (e.g., organic compounds, suspended solids, dissolved solids, phosphates, nitrogens, chlorides, sulfates, chromophores, and yeasts) as described above. In other cases, influent vinasse 100 comprises a mixture with one or more of the constituents (e.g., organic compounds, suspended solids, dissolved solids, phosphates, nitrogens, chlorides, sulfates, chromophores, and yeasts) as described above. In yet other cases, the influent vinasse 100 comprises an acidic mixture. In some cases, the influent vinasse 100 comprises a mixture at more than 60° C. The influent vinasse 100 can be transferred directly from a fermentation distillation source to the system 10 or can be transferred to a holding tank or reservoir until it is ready for treatment in system 10. The influent vinasse 100 can be transferred to the chemical oxidation system 200 via line 110. In some cases, the influent vinasse 100 can be transferred to the chemical oxidation system 200 via line 110 by passing through an influent screen and/or a pre-filter.

In some embodiments, the influent vinasse 100 is analyzed prior to treatment and/or analyzed during treatment. For example, the analysis 120 of the influent vinasse 100 can include determination of one or more of COD, BOD, TSS, TDS, TOC, turbidity, chloride concentration, sulfate concentration, pH, and temperature. In some cases, COD, BOD, TSS, TDS, TOC, turbidity, chloride concentration, sulfate concentration, pH, and temperature can be determined by any suitable method known in the art. In other cases, the analysis 120 of the influent vinasse 100 can be carried out prior to treatment, and the treatment can be modified accordingly (e.g., certain characteristics can indicate a need for the addition of greater quantities of reagents, longer incubation times, and/or additional treatment steps). In yet other cases, the analysis 120 of the influent vinasse 100 can be carried out during treatment to modify subsequent steps during the treatment (e.g., certain characteristics can indicate a need for the addition of greater quantities of reagents in subsequent steps, longer incubation times in subsequent steps, and/or additional treatment steps). In some instances, the analysis can be performed at the end of the treatment to determine if additional treatment is needed or if the treatment was successful.

In some embodiments, the analysis of the influent vinasse 100 includes spectroscopic analysis. For example, the analysis can include one or more of measurement of specific light transmission and absorbance at specific wavelengths. Specific light transmission can include measurement of percent light transmission at a specific wavelength. The analysis can also include absorbance at specific wavelengths including absorbance at about 254 nm.

Figure 2:
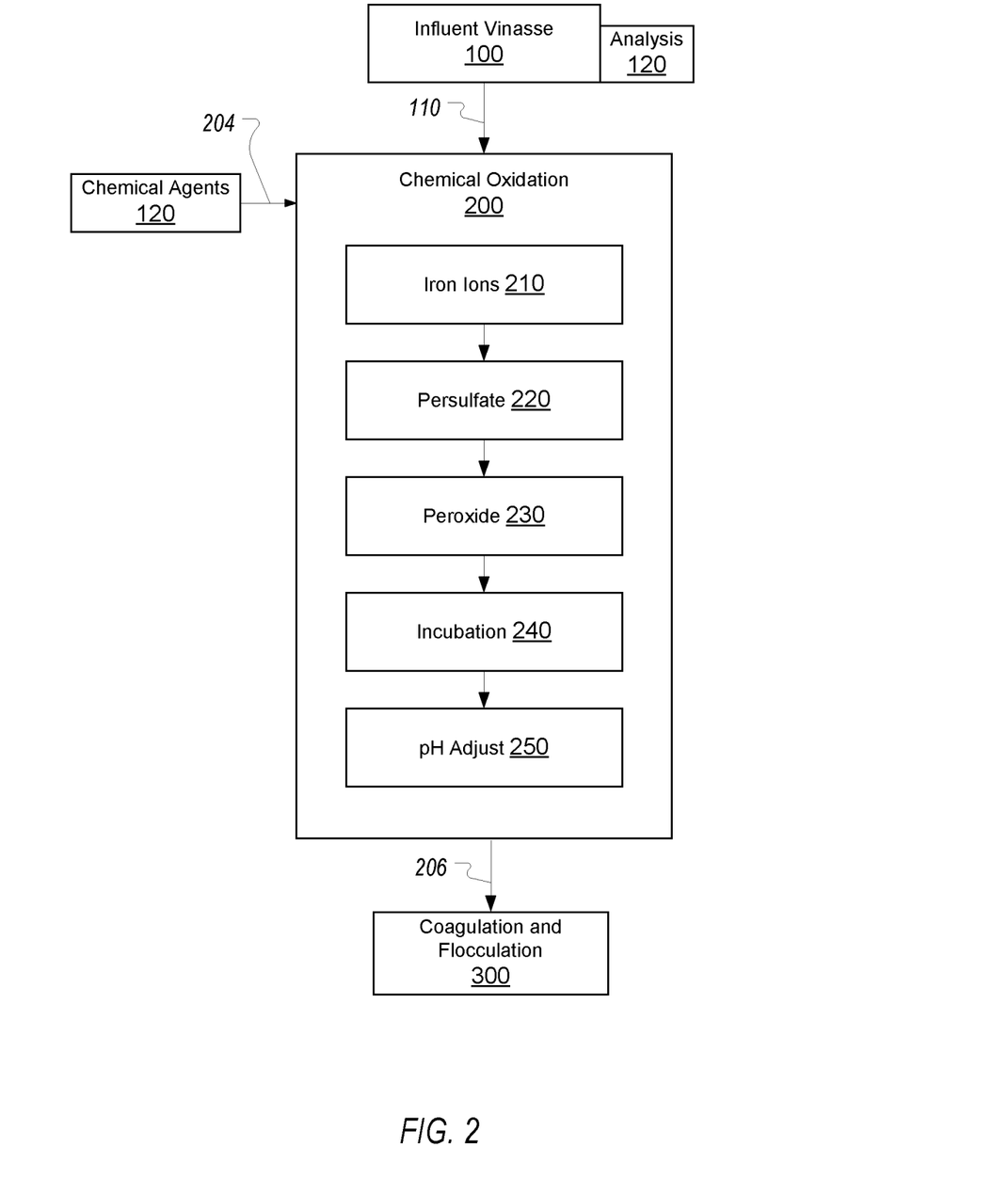
FIG. 2 illustrates systems and methods for chemical oxidation of vinasse.

Referring now to FIG. 2, with respect to chemical oxidation system 200, in some embodiments, the chemical oxidation system 200 comprises one or more additions of chemical agents 202 via line 204, reactions with chemical agents 202, and pH adjustments to the chemically treated mixture. In some cases, chemical agents 202 can include any suitable agent for treating influent vinasse 100 including ferrous iron ions, ferric iron ions, calcium oxide, calcium hydroxide, magnesium oxide, magnesium hydroxide, oxidants, oxidizing agents, persulfates, and peroxides. In other cases, pH adjustments can be carried out by the addition of any suitable acid and/or base such as a strong acid (e.g., HCl, $HNO_3$ and $H_2SO_4$) and/or a strong base (e.g., NaOH and KOH). In yet other cases, pH adjustments can be carried out by the addition of one or more of calcium hydroxide, calcium oxide, magnesium hydroxide, and magnesium oxide. In other embodiments, the identity of the chemical agents 202 employed, the sequence of addition of the chemical agents 202, the final concentration of the chemical agents 202, the time of reaction, the sequence of pH adjusting, and the ranges of the pH adjustment are configured to adequately treat influent vinasse 100.

With continued reference to FIG. 2, in some embodiments, the chemical oxidation system 200 comprises a step-wise reaction of the influent vinasse 100 with persulfate 220 followed by reaction with peroxide 230. In other embodiments, the chemical oxidation system 200 comprises a step-wise reaction of the influent vinasse 100 with ferrous iron ions 210 followed by reaction with persulfate 220 and followed by reaction with peroxide 230. In some cases, peroxide reaction mixture can be incubated 240. In other cases, following incubation 240, the pH of the incubated mixture can be adjusted 250.

In some embodiments, the reaction of the influent vinasse 100 with ferrous iron ions 210 comprises an addition of a solution of ferrous iron ions to the influent vinasse 100. The ferrous iron ion solution can be prepared in any suitable manner (e.g., a suitable iron ion compound is dissolved into a solution). In some cases, the ferrous iron ion solution can be prepared by obtaining a ferric iron ion solution, such as from a ferric chloride source, and then passing the prepared ferric chloride solution through metallic iron (e.g., steel wool, iron wool, iron filings, iron shavings, etc.) to generate a ferrous iron solution. In other embodiments, ferrous iron ions 210 are added to the vinasse to achieve a concentration of about 1 mg/L to about 50 mg/L in the influent vinasse 100. In some embodiments, ferrous iron ions 210 are added to the vinasse to achieve a concentration of about 1 mg/L to about 25 mg/L in the influent vinasse 100. In yet other embodiments, ferrous iron ions 210 are added to the vinasse to achieve a concentration of about 5 mg/L to about 15 mg/L in the influent vinasse 100. In some embodiments, ferrous iron ions 210 are added to the vinasse to achieve a concentration of about 5 mg/L, 6 mg/L, 7 mg/L, 8 mg/L, 9 mg/L, 10 mg/L, 11 mg/L, 12 mg/L, 13 mg/L, 14 mg/L, or about 15 mg/L in the influent vinasse 100.

In some embodiments, the reaction with persulfate 220 comprises an addition of a persulfate to the influent vinasse 100. In other embodiments, the reaction with persulfate 200 comprises the addition of a persulfate to influent vinasse 100 reacted with ferrous iron ions 210. In some cases the persulfate can comprise one or more of peroxomonosulfate, peroxydisulfate, potassium persulfate, ammonium persulfate, sodium persulfate, sodium peroxymonosulfate, sodium monopersulfate, potassium peroxymonosulfate, and potassium monopersulfate. In other cases, the persulfate is added as a dry powder. In yet other cases, the persulfate is added as a solution. In some cases, the persulfate is added as a solution prepared by diluting dry persulfate with a basic solution. In other cases, the persulfate is added as a dry product over a period of about 5 to 10 minutes.

In some embodiments, the COD of the influent vinasse 100 is measured and then the reaction with persulfate 220 is prepared such that a certain ratio of persulfate is added corresponding to the measured COD. For example, about 1 g/L of persulfate can be added for every 40,000 mg/L (40 g/L) of COD that is measured. In some instances, between about 0.5 g/L and 2 g/L of persulfate can be added for every 40,000 mg/L of COD that is measured in the influent vinasse 100. In other instances, between about 0.1 g/L and 10 g/L of persulfate (and any subrange therein) can be added for every 40,000 mg/L of COD that is measured in the influent vinasse 100. In other embodiments, one or more of other characteristics such as COD, BOD, TSS, TDS, TOC, turbidity, chloride concentration, and sulfate concentration can be determined and can be used to determine the ratio of persulfate that should be added.

In some embodiments, the reaction of peroxide 230 comprises an addition of peroxide. In other embodiments, the reaction of peroxide 230 comprises the addition of peroxide to the persulfate-treated mixture. In some cases, the peroxide can comprise any suitable peroxide. For example, the peroxide can comprise hydrogen peroxide at any suitable concentration (e.g., 3%, 30%, 35%, or 50%). Common, commercially available 3% hydrogen peroxide has been shown to work well. In some cases, the peroxide can be added incrementally at a rate of about 10 ml of 3% hydrogen peroxide per liter every 10 minutes. In other cases, the peroxide can be incrementally added to a final concentration of between about 30 ml/L and 50 ml/L and any subrange therein. In yet other cases, the peroxide can be added to the persulfate mixture in a ratio corresponding to a COD/TOC ratio. In some instances, the peroxide can be added to the persulfate mixture in a ratio of between about 0.5 g and 2.0 g of hydrogen peroxide per 1.5 g of persulfate used and any subrange therein. In other instances the peroxide can be added to the persulfate mixture in a ratio of about 1.2 g of hydrogen peroxide per 1.5 g of persulfate.

In some embodiments, the peroxide-treated mixture is incubated 240. In some cases, the peroxide-treated mixture is incubated 240 for about 3 hours. In other cases, the peroxide-treated mixture can be incubated 240 for between about 1 hour and 6 hours and any subrange therein. In yet other cases, the peroxide-treated mixture can be incubated 240 for more than 6 h. In some instances, the peroxide-treated mixture can incubated 240 at more than 60° C. In other instances, the peroxide-treated mixture can be incubated 240 at between about 68° C. and 75° C. and any subrange therein. In some cases, when the peroxide-treated mixture is incubated 240 for about 3 hours the reaction can be about 97.5% complete. It has been observed that a longer incubation time results in a more complete destruction of the unwanted organics present in the vinasse.

In some embodiments, the pH of the incubated mixture is adjusted 250. In some cases, the pH of the incubated mixture can be adjusted 250 by increasing the pH of the incubated mixture. For example, the pH of the incubated mixture can be increased to above about pH 6. The pH of the incubated mixture can also be increased to about pH 6.5. The pH of the incubated mixture can be adjusted by any suitable manner. In some cases, the pH of the incubated mixture can be adjusted 250 by adding an effective amount of a base, such as calcium hydroxide, calcium oxide, magnesium hydroxide, and magnesium oxide. In yet other cases, strong bases such as sodium hydroxide and/or potassium hydroxide can be used to adjust the pH. In some instances, the use of calcium or magnesium compounds instead of sodium compounds can be advantageous since it prevents the addition of sodium that may affect discharge of the treated product to the environment. The pH-adjusted mixture can be transferred to the coagulation and flocculation system 300 via line 206.

Returning to FIG. 1, in some embodiments, the coagulation and flocculation system 300 comprises reaction of the pH-adjusted mixture with an inorganic coagulant and a polymer. In other embodiments, the coagulation and flocculation system 300 comprises reaction of the pH-adjusted mixture with an inorganic coagulant and a polymer to coagulate and flocculate solids from the pH-adjusted mixture. In some cases, treatment with the inorganic coagulant and polymer in the pH-adjusted mixture yields filterable non-tacky particles. In other cases, treatment with the inorganic coagulant and polymer in the pH-adjusted mixture yields particles that are suitable for settling. In yet other cases, treatment with the inorganic coagulant and polymer in the pH-adjusted mixture yields filterable non-tacky particles that are suitable for centrifuge, filter press, microfiltration and/or settling. In some instances, one or more inorganic coagulants can be reacted with the pH-adjusted mixture, either in combination or sequentially. In other instances, one or more polymers can be reacted with the pH-adjusted mixture, either in combination or sequentially.

While the inorganic coagulant can be reacted with the pH-adjusted mixture at any suitable concentration, at least in some embodiments, the inorganic coagulant is reacted with the pH-adjusted mixture at a range of between about 100 mg/L and 2,000 mg/L, and any subrange therein. In other embodiments, the inorganic coagulant is reacted with the pH-adjusted mixture at a range of between about 500 mg/L and 1,000 mg/L, and any subrange therein. In other embodiments, the inorganic coagulant is reacted with the pH-adjusted mixture at a concentration that corresponds to one or more of the TS and TSS present in the influent vinasse 100.

In some embodiments, the inorganic coagulant comprises any inorganic coagulant suitable for coagulating solids found in the pH-adjusted mixture. In other embodiments, inorganic coagulants can include an aluminum-based inorganic coagulant. Aluminum chlorohydrate compounds having the general formula $Al_nCl_{(3n-m)}(OH)_m$ can be used as inorganic coagulants. Other aluminum-based inorganic coagulants include, but are not limited to, aluminum hydroxychloride, aluminum chlorohydroxide, aluminum chloride basic, aluminum chlorohydrol, and polyaluminum chloride. In yet other embodiments, the inorganic coagulants include, but are not limited to, one or more of aluminum sulfate ($Al_2(SO_4)_3$), aluminum chloride ($AlCl_3$), polyaluminum sulfate, sodium aluminate, ferric chloride ($FeCl_3$), ferric sulfate ($Fe_2(SO_4)_3$), and ferrous iron compounds, ferric iron compounds, ferrous chloride, ferrous sulfate, ferric chloride, ferric sulfate, ferric chloro-sulfate, silicates, dithiocarbamate, and dithiocarbonic acid.

In some embodiments, the polymer comprises any suitable organic polymer. In other embodiments, the organic polymer comprises an organic polymer with a molecular weight of about 200,000 to 800,000 Da. In some cases, the polymer can be a cationic polymer (e.g., a quaternized polymer). In other cases, the polymer can be a potable grade polymer. One non-limiting example of a suitable polymer is epi-dma, a condensation product of epichlorohydrin and dimethylamine having the general description:

where the molecular weight is typically between 200,000 and 800,000 Da. In other embodiments, suitable polymers include, but are not limited to, DADMAC (diallyldimethyl ammonium chloride), linear polyamines, and branched polyamines.

While the polymer can comprise any suitable molecular weight, at least in some embodiments, the polymer comprises a molecular weight of about 200,000 to about 800,000 Da and any subrange therein. In other embodiments, the molecular weight of the polymer can be tailored to the nature of the specific polymer and/or the nature of the contaminant(s) to be removed. For example, when using epi-dma to treat vinasse comprising organic contaminants, an epi-dma of molecular weight about 350,000 to about 400,000 Da can be preferred. When using DADMAC polymers, the preferred molecular weight range can be higher compared to the molecular weight range of epi-dma (e.g., a preferred range of about 450,000 to about 550,000 Da for DADMAC polymers). In yet other embodiments, the polymer comprises a molecular weight of about 200,000 to about 400,000 Da and any subrange therein. In some cases, the polymer comprises a molecular weight of about 250,000 to 350,000 Da and any subrange therein.

While the polymer can be reacted at any suitable concentration, at least in some embodiments, the polymer is reacted at a range of about 50 mg/L to about 800 mg/L, and any subrange therein. In other embodiments, polymer is reacted at a range of about 300 mg/L to about 500 mg/L and any subrange therein. In yet other embodiments, polymer is reacted at about 250 mg/L to about 350 mg/L and any subrange therein. In some embodiments, polymer is reacted at least about 50 mg/L, about 100 mg/L, about 150 mg/L, about 200 mg/L, about 250 mg/L, about 300 mg/L, about 350 mg/L, about 400 mg/L, about 450 mg/L, about 500 mg/L, about 550 mg/L, about 600 mg/L, about 650 mg/L, about 700 mg/L, about 750 mg/L, or about 800 mg/L. In some cases, the amount of polymer added can be correlated to the amount of total solids (TS) in the influent vinasse 100. For example, when the influent vinasse 100 comprises a TS of 40,000 mg/L or greater, the polymer can be added in the range of about 300 mg/L to about 500 mg/L. When the influent vinasse 100 comprises a TS of less than about 40,000 mg/L, the polymer can be added in the range of about 250 mg/L to about 350 mg/L.

In some embodiments, the ratio of inorganic coagulant to low molecular weight polymer can be tailored to the nature of the specific inorganic coagulant and/or polymer and/or the nature of the contaminant(s) to be removed. For example, a ratio of inorganic coagulant to polymer may be in the range of 0.5:1 (inorganic coagulant to polymer) to 10:1 (inorganic coagulant to polymer). In other embodiments, the ratio of inorganic coagulant to polymer is in the range of 2:1 to 5:1. In yet other embodiments, the ratio of inorganic coagulant to polymer is in the range of 3:1 to 4:1 (inorganic coagulant to polymer). In some cases, the ratio of inorganic coagulant to polymer can be about 1:1, 2:1, 3:1, 4:1, 5:1, 6:1, 7:1, 8:1, 9:1, or 10:1.

In some embodiments, the coagulation and flocculation system 300 increases the physical size of contaminants and solids in the influent vinasse 100 by encapsulating the contaminants and solids into filterable non-tacky particles. In other embodiments, the coagulation and flocculation system 300 can increase the physical size of contaminants and solids in the influent vinasse 100 to generate bulk solids and filterable non-tacky particles. In yet other embodiments, the coagulation and flocculation system 300, encapsulates the contaminants and solids into filterable non-tacky particles with an average size of about 25 to about 150 microns. In some cases, the coagulation and flocculation system 300 encapsulates the contaminants and solids into filterable non-tacky particles with an average size of about 50 to about 100 microns. In other cases, the coagulation and flocculation system 300, encapsulates the contaminants and solids into filterable non-tacky particles with an average size of about 10, 20, 30, 40, 50, 60, 70, 80, 90, 100, 110, 120, 130, 140, or 150 microns.

In some embodiments, the coagulation and flocculation system 300 comprises a second reaction with a polymer. The second reaction with a polymer can be carried out after the reaction with the first polymer. While the second reaction with a polymer can comprise any suitable polymer, at least in some cases, the second reaction polymer comprises a high molecular weight polymer. For example, the second reaction polymer can comprise a high molecular weight anionic polymer. The second reaction polymer can comprise a high molecular weight anionic polymer such as a polyacrylamide. In some instances, the high molecular weight anionic polymer can comprise a molecular weight of between about 5,000,000 Da to about 25,000,000 Da. In other instances, the high molecular weight anionic polymer can comprise a molecular weight of between about 10,000,000 Da to about 20,000,000 Da. The second reaction polymer can be reacted at any effective concentration. In some cases, the second reaction polymer is reacted at between about 1 mg/L and about 50 mg/L. In other cases, the second reaction polymer is reacted at between about 5 mg/L and about 20 mg/L.

In some embodiments, the second reaction with the second reaction polymer further promotes formation of solids. In other embodiments, the second reaction with the second reaction polymer promotes the formation and settling of solids. In yet other embodiments, the second reaction with the second reaction polymer forms particles that can be separated by microfiltration screens. In some cases, the particles can be separated by microfiltration screens of about 50 microns to about 100 microns. The particles can also be separated by one or more of centrifuge and filter press. In other cases, the solid particles can comprise more than about 10% by weight of the total effluent.

In some embodiments, filterable non-tacky particles comprise one or more of low viscosity and low tackiness. In other embodiments, the filterable non-tacky particles are highly dewatered (e.g., less than 15% as bound water). In yet other embodiment, the filterable non-tacky particles are one or more of easily filtered by mechanical filtration techniques, including filter press, microfiltration, and so forth. In some embodiments, the filterable non-tacky particles are configured to encapsulate one or more of total dissolved solids, total suspended solids, settleable solids, COD, BOD, TOC, organic compounds, and biological substances. In other embodiments, the identity, concentration, and reaction time of the chemical agents 202 are varied to generate filterable non-tacky particles of a desired size, filterability, and/or non-tackiness. In yet other embodiments, the identity, concentration, and reaction time of the chemical agents 202 are varied to form filterable non-tacky particles that are of sufficient size to not pass through a microfiltration membrane.

With continued reference to FIG. 1, at least in some embodiments, the coagulated and flocculated mixture is transferred via line 306 to the solids separation system 400. While the solids separation system 400 can be configured in any suitable manner and comprise any suitable component, at least in some embodiments, the solids separation system 400 comprises a lamella clarifier or an inclined plate settler. The lamella clarifier can be configured to remove coagulated and flocculated solids from the coagulated and flocculated mixture to generate a clarified fraction. The lamella clarifier can also be configured to remove bulk solids from the coagulated and flocculated mixture to generate a clarified fraction. In other embodiments, the solids separation system 400 comprises one or more of sedimentation, settling tanks, clarifiers, filter press, belt press, centrifugation, and microfiltration configured to remove coagulated and flocculated solids from the coagulated and flocculated mixture to generate a clarified fraction. In some cases, the separated bulk solids and/or coagulated and flocculated solids can be transferred to a solids by-product system 420 via line 404. The separated bulk solids and/or coagulated and flocculated solids can be processed by screw press for solids agglomeration and to recycle liquids to the influent vinasse 100 or to the distillation system 500. In other cases, the solids separation system 400 can remove more than about 150 g of solids per liter of influent vinasse 100. In yet other cases, the solids separation system 400 can remove between about 175 g and 350 g of solids per liter of influent vinasse 100.

In some embodiments, the clarified fraction can be transferred to the distillation system 500 via line 406. In yet other cases, the clarified fraction can be passed through a microfilter screen before being transferred to the distillation system 500. The microfilter screen can comprise any suitable pore size (e.g., 10, 25, 50, 100, 150, or 200 microns). In some instances, the microfilter screen comprises a pore size of between about 25 microns and 50 microns, and any subrange therein.

Additionally, FIG. 1 shows that, in some embodiments, the system 10 comprises a distillation system 500 configured to distill the clarified fraction. In other embodiments, the distillation system 500 is configured to distill the clarified fraction into a distillation condensate and concentrate bottom. While the distillation system 500 can be configured in any suitable manner to distill the clarified fraction, at least in some embodiments, it comprises low temperature vacuum distillation configured to distill the clarified fraction into a distillation condensate and concentrate bottom. In some cases, the distillation system 500 can be configured as a single pass vacuum distillation system. Although the single pass vacuum distillation system can be configured in any suitable manner, at least in some embodiments, the single pass vacuum distillation system can be configured with one or more of a pot temperature of about 93.3° C., a vacuum of about 60 mm Hg, and a distillation column temperature of about 40° C. In some cases, the concentrate bottom generated by the distillation system 500 can be transferred to a concentrate bottom system 520 via line 504. In other cases, the distillation condensate can be transferred to the condensate storage system 600 via line 506.

In some embodiments, the distillation system 500 comprises one or more evaporators. In other embodiments, the distillation system 500 comprises one or more evaporators configured to evaporate the clarified fraction. For example, the distillation system 500 can comprise one or more of a natural circulation evaporator, a forced circulation evaporator, a falling film evaporator, a rising film evaporator (e.g., a long tube vertical evaporator), a climbing and falling film evaporator, a multiple effect evaporator, and an agitated thin film evaporator. In some cases, the distillation system 500 comprises a falling film evaporator configured to evaporate the clarified fraction into an evaporative fraction. In other cases, the evaporative fraction can be condensed to form a condensate. In yet other cases, the condensate can be transferred to the condensate storage system 600. In some instances, the falling film evaporator can be configured to evaporate the clarified fraction to separate the evaporative fraction from a concentrate bottom fraction. The evaporative fraction can be condensed to form a condensate which can be transferred to the condensate storage system 600. The concentrate bottom fraction can be transferred to the concentrate bottom system.

As shown in FIG. 1, the condensate storage system 600 is configured to receive distillation condensate. The condensate storage system 600 can also be configured to store the distillation condensate for future use. For example, the distillation condensate can be stored for future use in the distilled alcohol beverage process. In some cases, the distillation condensate can be discharged to the environment. In other cases, the distillation condensate can be transferred to the distribution system 700 via line 606.

As shown in FIG. 1, the distribution system 700 is configured to receive the distillation condensate from the condensate storage system 600. The distribution system 700 can be configured in any suitable manner to prepare the received distillation condensate to be distributed. For example, in some cases, the distribution system 700 can receive the distillation condensate and prepare it for discharge to the environment. In other cases, the distribution system 700 can receive the distillation condensate and prepare it for distribution as agricultural water. In yet other cases, the distribution system 700 can receive the distillation condensate and prepare it for distribution as potable water. The distribution system 700 can comprise any suitable processes to render the distillation condensate as useable water. For example, the distribution system 700 can include one or more of membrane filtration, microfiltration, ultrafiltration, reverse osmosis filtration, UV exposure, chlorination, and ozone disinfection.

The disclosed methods of treating vinasse can have several useful features. First, the disclosed methods of treating vinasse can reduce the difficulty and expense of cleaning equipment used in the method. For example, in conventional distillation methods, the concentrate bottoms must be removed from the bottoms of the distillation apparatus and the bottoms of the distillation apparatus must be cleaned.

This process of cleaning the bottoms of the distillation apparatus can be difficult and expensive due to the nature of contaminant residues left behind in the bottoms of the distillation apparatus. In the disclosed methods, the bottoms of the distillation apparatus can be simply cleaned with hot water thereby simplifying and reducing the expense of cleanup. The ability to simply clean the bottoms of the distillation apparatus with hot water also reduces generated waste and/or reduces down time of the apparatus.

Second, the disclosed methods of treating vinasse can reduce the difficulty and expense of discharging the liquid waste from distilled alcohol beverage production. The disclosed methods of treating vinasse yield useable water that can be discharged directly to the environment and/or used as agricultural and/or potable water. The useable water can also be used as influent water for the alcohol beverage production and can thereby reduce the amount of new influent water required. Because the useable water can be used as influent water for the distilled alcohol beverage production, the disclosed methods of treating vinasse can permit the distilled alcohol beverage production to be configured as zero liquid discharge. A zero liquid discharge configuration avoids the need to discharge and/or dispose of liquid waste and can be advantageous in areas where fresh water supplies are limited.

Third, the disclosed methods of treating vinasse can yield useable solids. The solids by-product formed by the disclosed methods can be used and/or sold. For example, the formed solids can be used as feed for animals (e.g., chicken feed, hog feed, and cattle feed). The formed solids can also be used as feedstock for anaerobic digestion. The formed solids can be used as feedstock for anaerobic digestion to form methane. The formed solids can also be used as a soil conditioner. Therefore, the disclosed methods can yield useable solids in addition to useable water.

The following examples and experimental results are given to illustrate various embodiments within the scope of the present disclosure. These are given by way of example only, and it is understood that the following examples are not comprehensive or exhaustive of the many types of embodiments of the present disclosure that can be prepared in accordance with the present disclosure.

Example 1

A vinasse treatment study was carried out with vinasse supplied by a Caribbean rum distillery. The study indicated that a treatment of vinasse removed greater than 98% of the contaminants found in the vinasse. Raw vinasse samples were received from the Caribbean rum distillery and divided into three samples: Sample 1, Sample 2, and Sample 3. Sample 1 comprised raw untreated vinasse. Sample 2 comprised raw vinasse that was directly distilled by vacuum distillation. Sample 3 comprised raw vinasse that was sequentially treated with ferrous iron ions, treated with persulfate, treated with peroxide, incubated for three hours, pH adjusted to pH 6.5, treated with inorganic coagulant, treated with polymer, had solids removed, and vacuum distilled. For Sample 2 and Sample 3, the vacuum distillation was configure as a single pass with the pot temperature at 93.3° C., vacuum at 60 torr (60 mm Hg), and distill column temperature at 40° C. Samples 1-3 were then analyzed for TS, TSS, TOC, COD, BOD, TDS, and turbidity and the results shown in Table 1.

TABLE 1

| Test | Sample 1 (Raw vinasse) | Sample 2 (Distillation only) | Sample 3 (Oxidation and distillation) |
| --- | --- | --- | --- |
| Total Solids (TS) (mg/L) | 55,200 | <25 | <25 |
| Total Suspended Solids (TSS) (mg/L) | 9,650 | Not detectable (<3 mg/L) | Not detectable (<3 mg/L) |
| Total Organic Content (TOC) (mg/L) | 22,000 | 760 | 44 |
| Chemical Oxygen Demand (COD) (mg/L) | 71,900 | 2,240 | 137 |
| Biological Oxygen Demand (BOD) (mg/L) | 25,100 | 1,200 (estimated) | 48 (estimated) |
| Total Dissolved Solids (TDS) (mg/L) | >13,000 | <150 | <50* |
| Nephelometric Turbidity Units (NTU) | >800 | 20.5 (haze) | 0.37 |

*Measured in Water Solutions Inc. lab

The results indicated that there was large reduction in contaminant values between the raw vinasse sample (Sample 1) and Samples 2 and 3. The results also indicate substantial reduction in TOC, COD, BOD, and turbidity between Sample 2 (Distillation only) and Sample 3 (Oxidation and distillation). There was a 94.2% reduction in TOC from 760 mg/L in Sample 2 to 44 mg/L in Sample 3. There was a 93.9% reduction in COD from 2,240 mg/L in Sample 2 to 137 mg/L in Sample 3. There was a 96% reduction in BOD from 1,200 mg/L in Sample 2 to 48 mg/L in Sample 3. There was a more than 97% reduction in turbidity from 20.5 NTU in Sample 2 to <0.5 mg/L in Sample 3.

Example 2

Figure 3:
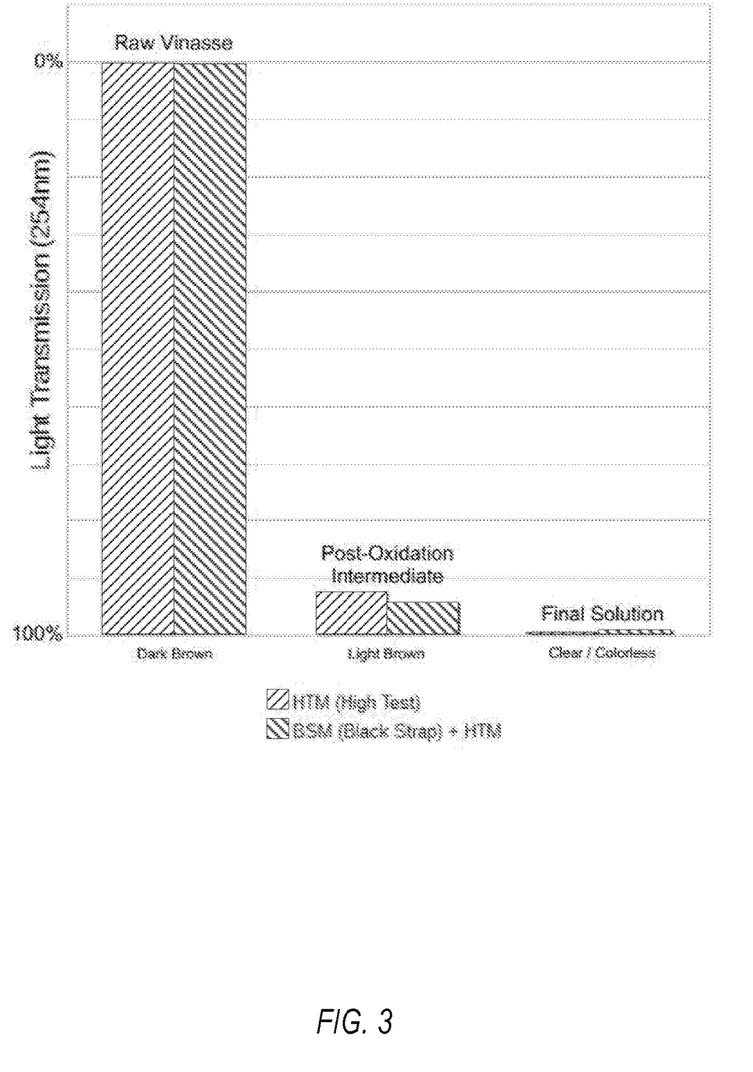
FIG. 3 illustrates light transmission analysis during treatment of vinasse.

Samples of raw vinasse were obtained and treated as described above. A first sample comprised raw vinasse produced by fermentation and distillation of high test molasses. A second sample comprised raw vinasse produced by fermentation and distillation of a mixture of high test molasses and black strap molasses. Each sample was sequentially treated with ferrous iron ions, treated with persulfate, treated with peroxide, incubated for three hours, pH adjusted to pH 6.5, treated with inorganic coagulant, treated with polymer, had solids removed, and vacuum distilled. During the treatment of the first and second samples, the transmission of light at 254 nm was monitored. FIG. 3 illustrates the transmission of light at 254 nm of the raw vinasse, of a post-oxidation intermediate, and of a final solution for both the first and second samples. The results indicate a transition from a dark brown color for the raw vinasses to a final clear/colorless color for the treated vinasses.

Example 3

Figure 4:
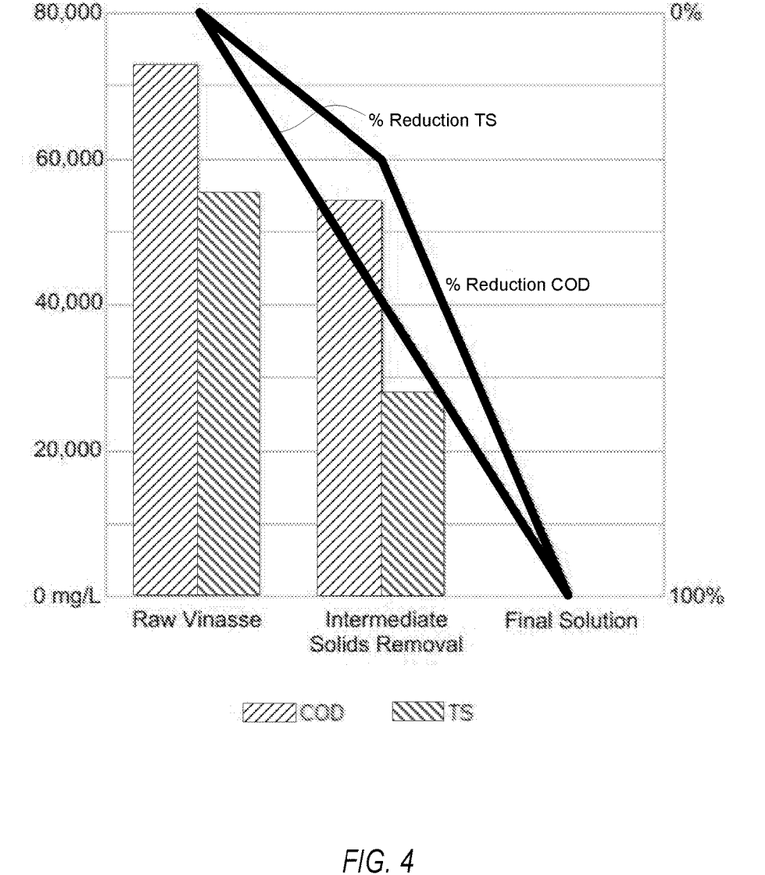
FIG. 4 illustrates solids removal and chemical oxygen demand (COD) during treatment of vinasse.

A sample of raw vinasse was obtained and treated as described above. The sample was sequentially treated with ferrous iron ions, treated with persulfate, treated with peroxide, incubated for three hours, pH adjusted to pH 6.5, treated with inorganic coagulant, treated with polymer, had solids removed, and vacuum distilled. The removal of solids and COD was monitored during the treatment process. FIG. 4 illustrates the removal of solids and COD during the treatment of the sample. The removal in mg/L and by percent of solids and COD during treatment of the sample is shown for raw vinasse, for after intermediate solids removal, and for the final solution is illustrated in FIG. 4.

The terms "a," "an," "the" and similar referents used in the context of describing the invention (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate the invention and does not pose a limitation on the scope of the invention otherwise claimed. No language in the specification should be construed as indicating any non-claimed element essential to the practice of the invention.

It is contemplated that numerical values, as well as other values that are recited herein are modified by the term "about", whether expressly stated or inherently derived by the discussion of the present disclosure. As used herein, the term "about" defines the numerical boundaries of the modified values so as to include, but not be limited to, tolerances and values up to, and including the numerical value so modified. That is, numerical values can include the actual value that is expressly stated, as well as other values that are, or can be, the decimal, fractional, or other multiple of the actual value indicated, and/or described in the disclosure.

Groupings of alternative elements or embodiments of the invention disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments of this invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The embodiments of the invention disclosed herein are illustrative of the principles of the present invention. Other modifications that may be employed are within the scope of the invention. Thus, by way of example, but not of limitation, alternative configurations of the present invention may be utilized in accordance with the teachings herein. Accordingly, the present invention is not limited to that precisely as shown and described.

The invention claimed is:

1. A method for treating vinasse, the method comprising:
    obtaining a quantity of vinasse;
    reacting the vinasse with persulfate to form an oxidized mixture;
    reacting the oxidized mixture with peroxide to form a peroxide-treated mixture;
    adjusting the pH of the peroxide-treated mixture to a pH value in the range from pH 6 to pH 7, to form a pH-adjusted mixture;
    reacting the pH-adjusted mixture with an inorganic coagulant and a low molecular weight cationic polymer to form solid particles; and
    removing the solid particles to yield a liquid fraction.

2. The method of claim 1, further comprising vacuum distilling the liquid fraction to yield a distilled fraction.

3. The method of claim 1, further comprising evaporating the liquid fraction to yield an evaporative fraction.

4. The method of claim 1, further comprising reacting the vinasse with ferrous iron ions before reacting with persulfate.

5. The method of claim 4, wherein the ferrous iron ions are added to the vinasse to achieve a concentration of between 1 mg/L and 25 mg/L in the vinasse.

6. The method of claim 1, wherein reacting the oxidized mixture with peroxide comprises reacting the oxidized mixture with the peroxide for 2 to 4 hours.

7. The method of claim 1, wherein the vinasse is at a temperature above 65° C.

8. The method of claim 1, wherein the vinasse is at an acidic pH below 5.

9. The method of claim 1, wherein the inorganic coagulant comprises an aluminum-based inorganic coagulant.

10. The method of claim 9, wherein the inorganic coagulant comprises aluminum chlorohydrate.

11. The method of claim 1, wherein the polymer comprises epi-dma (poly(epichlorhydrin-dimethylamine).

12. A method for treating vinasse, the method comprising:
    obtaining a quantity of vinasse at an acidic pH;
    measuring the chemical oxygen demand (COD) of the vinasse;
    reacting the vinasse with persulfate at a ratio of 1 gram of persulfate per 40,000 mg/L of COD to form an oxidized mixture;
    reacting the oxidized mixture with peroxide to form a peroxide-treated mixture;
    adjusting the pH of the peroxide-treated mixture to a pH value in the range from pH 6 to 7, to form a pH-adjusted mixture;
    reacting the pH-adjusted mixture with an aluminum-based inorganic coagulant and a low molecular weight cationic polymer to form solid particles; and removing the solid particles to yield a liquid fraction.

13. The method of claim 12, further comprising reacting the vinasse with ferrous iron ions after measuring the COD and before reacting with persulfate.

14. The method of claim 13, wherein the ferrous iron ions are added to the vinasse to achieve a concentration of between 1 mg/L and 25 mg/L in the vinasse.

15. The method of claim 12, wherein reacting the oxidized mixture with peroxide comprises reacting the oxidized mixture with a 3% hydrogen peroxide solution at a ratio of 1.2 hydrogen peroxide to 1.5 persulfate by weight.

16. The method of claim 12, wherein removing the solid particles comprises one or more of lamella clarification, belt press, filter press, screw press, microfiltering, and centrifuging.

17. A method for generating distillation condensate water from vinasse, the method comprising:
- obtaining a quantity of vinasse at a pH of below 5;
- reacting the vinasse with ferrous iron ions to form a ferrous mixture, wherein the ferrous iron ions are added to the vinasse to achieve a concentration of between 1 mg/L and 25 mg/L in the vinasse;
- reacting the ferrous mixture with persulfate to generate an oxidized mixture;
- reacting the oxidized mixture with peroxide to generate a peroxide-treated mixture;
- adjusting the pH of the peroxide-treated mixture to a pH value above pH 6 to form a pH-adjusted mixture;
- reacting the pH-adjusted mixture with an aluminum-based inorganic coagulant and a low molecular weight cationic polymer to form solid particles;
- removing the solid particles to yield a liquid fraction; and
- distilling the liquid fraction to yield distillation condensate water.

18. The method of claim 17, wherein the vinasse comprises a chemical oxygen demand of above 50,000 mg/L.

19. The method of claim 17, wherein adjusting the pH of the peroxide-treated mixture comprises adjusting the pH to a pH value between 6.0 and 6.9.

20. The method of claim 17, wherein distilling comprises single pass vacuum distillation.

* * * * *